United States Patent [19]

Feltenberger

[11] 4,274,008
[45] Jun. 16, 1981

[54] TIDE GENERATOR

[76] Inventor: Bruce D. Feltenberger, 404 W. 10th St., Erie, Pa. 16501

[21] Appl. No.: 970,640

[22] Filed: Dec. 18, 1978

[51] Int. Cl.³ .............................................. F03B 13/12
[52] U.S. Cl. ...................................... 290/42; 290/53
[58] Field of Search ..................... 290/42, 43, 53, 54; 417/330, 334

[56] References Cited

U.S. PATENT DOCUMENTS

| | | | |
|---|---|---|---|
| 2,820,148 | 1/1958 | Southwick | 290/42 X |
| 3,426,540 | 2/1969 | Fixel | 290/42 X |
| 4,039,847 | 8/1977 | Diggs | 290/42 |
| 4,060,344 | 11/1977 | Ootsy | 290/42 X |
| 4,141,670 | 2/1979 | Russell | 290/53 X |

Primary Examiner—J. V. Truhe
Assistant Examiner—W. E. Duncanson, Jr.
Attorney, Agent, or Firm—Charles L. Lovercheck

[57] ABSTRACT

A tidewater power system consisting of a high tide reservoir and a low tide reservoir. The high tide reservoir has an inlet adapted to be supported at high tide level and an outlet with a water wheel and generator between the outlet of the high tide reservoir and the low tide reservoir. The low tide reservoir has an outlet at the low tide level. The outlet from the high tide reservoir is adjustable to control the flow rate and the high tide reservoir can be closed at high tide to retain water for use over a period of time.

9 Claims, 5 Drawing Figures

TIDE GENERATOR

GENERAL DESCRIPTION OF THE INVENTION

A tidewater power system consisting of two reservoirs and one or more water wheel generator arrangements are disclosed. One reservoir's position substantiates high tide level in or adjacent to a body of water subject to tidal action, so that during the high tide period the reservoir completely fills with water, the reservoir being of sufficient size to hold enough water to provide a continuous flow of water to the water wheel until the next high tide period when the reservoir will completely fill again with water. The water wheel is connected to a generator or it is an integral part of a turbine and produces electricity from the rotating movement imparted from the water flow. The second reservoir is positioned substantially at low tide level and catches the water flowing from the first reservoir through the water wheel. The water is then returned to the open body of water during the low tide period.

OBJECTS OF THE INVENTION

It is an object of the invention to provide a system for generating electricity which derives its source of power from the natural movement of a body of water subject to tidal action.

Another object of the invention is to provide a system for generating electricity which is simple in construction, economical to manufacture and simple and efficient to use.

A further object of the invention is to provide a water power generating system which is adapted to be constructed along a shoreline subject to tidal action.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
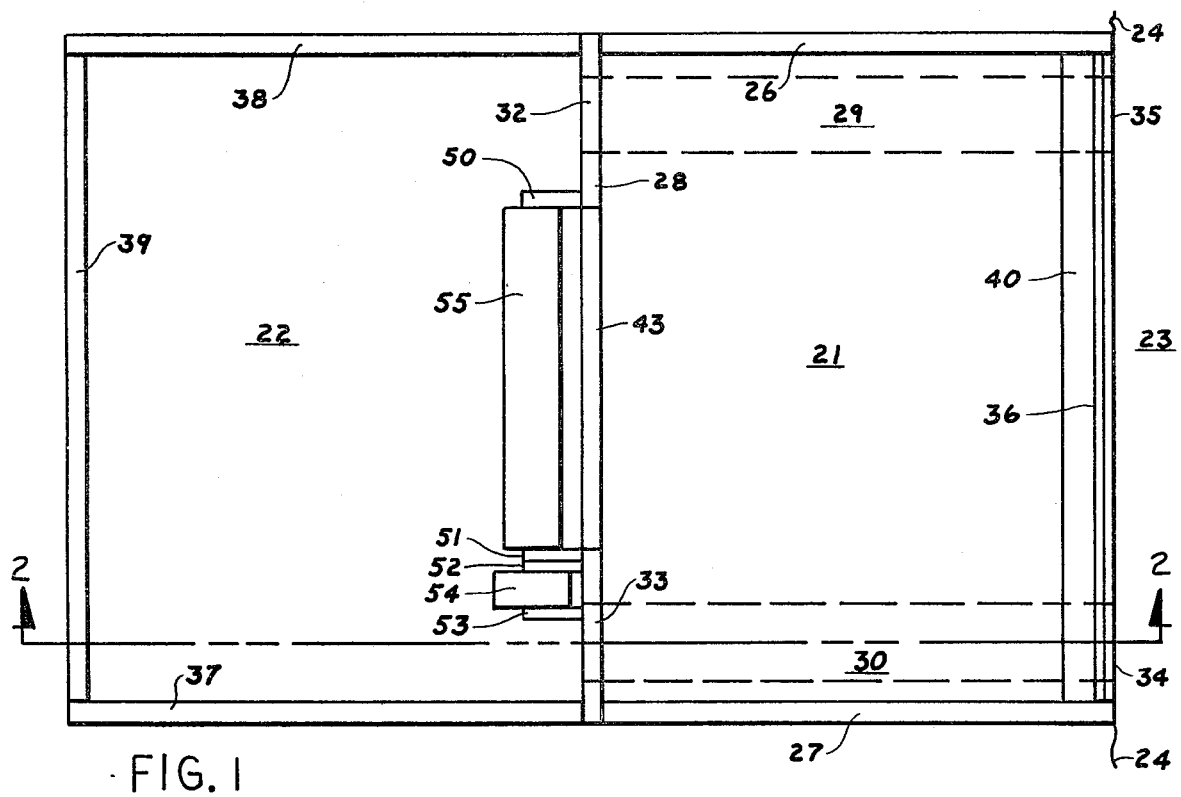
FIG. 1 is a schematic plan view of the generating system according to the invention.
Figure 2:
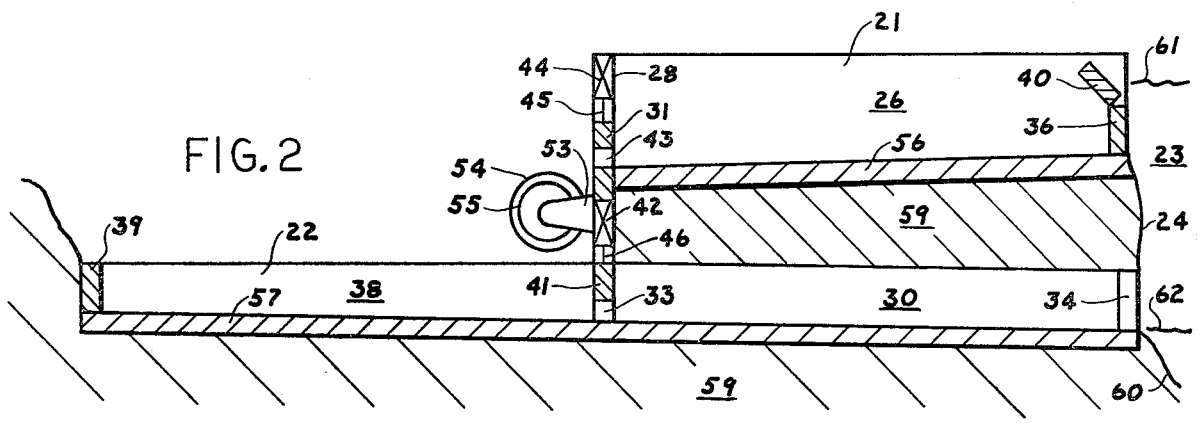
FIG. 2 is a cross-sectional view taken on line 2—2 of FIG. 1.

Now, with more particular reference to the drawings, In the embodiments of FIGS. 1 and 2, a high tide reservoir 21 is disclosed constructed on a shoreline 24 with its end 36 in contact with a body of water 23 subject to tidal action. The high tide reservoir 21 is made up of a bottom 56, two sides 26 and 27 and two end members 28 and 36. The bottom of the high tide reservoir 21 is preferably constructed on an existing shore 59 at a height substantially below the high tide level 61 and substantially above the low tide level 62. The end 36 of the high tide reservoir can be fixed permanently in position so that the high tide will flow over it to fill the high tide reservoir 21 or it can be movable up and down to permit the storage of a greater amount of water. This movement can be accomplished through any well known means. The end member 36 can also have a floating gate 40 hinged to it so that the reservoir automatically fills with the maximum amount of water. This provides a means of capturing and storing an additional amount of water during stormy or windy conditions when the waves are higher than normal.

The side members 26 and 27 and end members 28 are of sufficient height to slightly exceed the highest anticipated level of water in the reservoir. The end member 28 has one or more openings 43 positioned in line with the bottom of the high tide reservoir 21 so as to permit a continuous flow of water from the reservoir 21 to one or more water wheels 55. The size of the openings 43 can be fixed permanently or can be adjustable up and down by means of one or more gates 31 which are illustrated with a hydraulic cylinder 44 and piston 45 which can move the gates up and down so as to produce a greater or lesser amount of water flow to the water wheel. In this manner the water flow to the water wheel can be regulated according to the load imposed on the generator and during stormy or windy periods when the reservoir fills with a greater amount of water the gates can be raised to produce a greater water flow into or through the water wheel 55. The water wheel 55 is preferably supported by means of mounting brackets 50 and 51 which are attached to the high tide reservoir end member 28 which in its entirety is a vertical wall. The water wheel drives one or more generators 54 which are supported by mounting brackets 52 and 53.

It can thus be seen that during stormy or windy periods and the amount of time following such periods until the next high tide period, more electricity can be generated than normal due to an increased amount of water in the high tide reservoir and an increased water flow to the water wheel. This excess electricity could be stored in storage batteries.

A low tide reservoir 22 is positioned substantially beneath the water wheel 55 and receives and stores the water flowing from the high tide reservoir through the water wheel. The reservoir 22 is made up of a bottom 57, two side members 37 and 38 and two end members 39 and 28. The bottom of the reservoir can be constructed on an existing shore 59 at a height slightly above the low tide level 62. The end member 28 of the low tide reservoir has one or more openings 32 and 33 which can be increased or decreased in size by means of one or more gates 41 as illustrated with a hydraulic cylinder 42 and piston 46. In this manner the gates can be closed to retain water in the reservoir 22 and opened during low tide period to allow discharge of the water through one or more drain lines 29 and 30 to the open body of water. The drain lines shall be of sufficient number and size so as to allow complete drainage of the low tide reservoir during the low tide period. The drain lines can be constructed with end members 34 and 35 which can be adjustable to be opened or closed, thereby preventing water from entering from the sea when the water level is above the low tide level 62.

Figure 3:
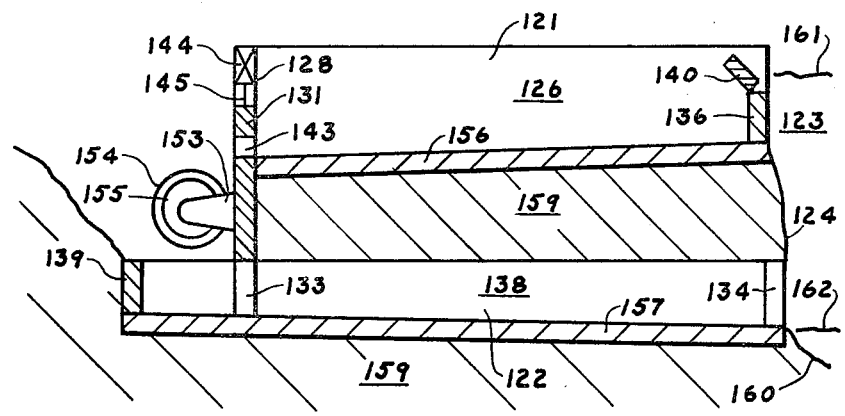
FIG. 3 is a cross-sectional view similar to FIG. 2 of another embodiment of the invention.

In the embodiment of the invention shown in FIG. 3 we show a low tide reservoir 122 which is positioned substantially beneath a high tide reservoir 121. In this embodiment the system functions essentially in the same manner as that in FIGS. 1 and 2 but the overall size requirements are reduced. In this embodiment the openings 32 and 33 are increased in length reaching nearly across the reservoir 122 leaving occasional supports for end member 128. The high tide reservoir has sides 126 and 127 and ends 128 and 136. The size of outlet 143 can be adjustable by moving gate 131 up or down by cylinder 144, thereby directing water to the water wheel 155 which may be connected to a generator 154 supported on brackets 153. The end 139 of the low tide reservoir completes the enclosure of the low tide reservoir which has sides 138 and discharge gate 134 which may close during high tide periods. Likewise, bottom 157 completes the low tide reservoir. 124 indicates the shoreline adjacent the body of water. 159 indicates the existing shore.

Figure 4:
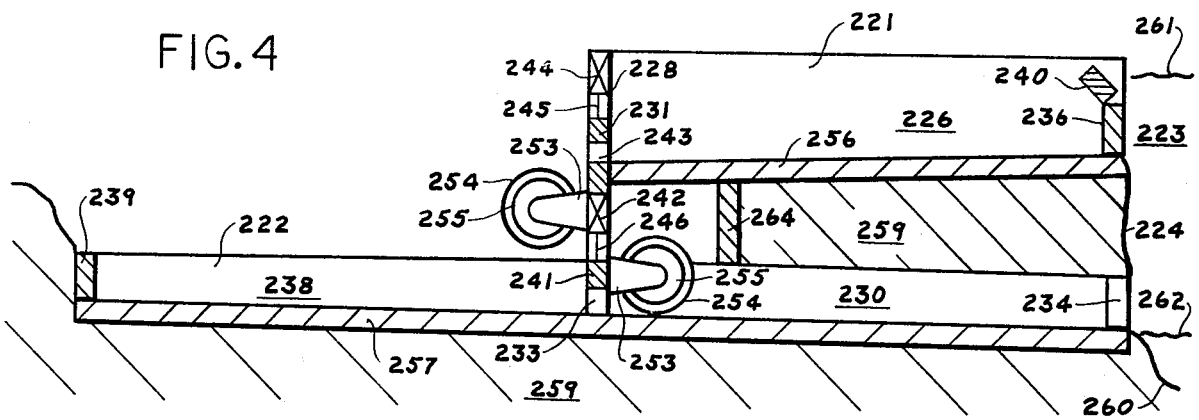
FIG. 4 is a cross-sectional view similar to FIG. 2 of yet another embodiment of the invention.

In the embodiment of the invention shown in FIG. 4, we indicate water wheel generators 254 and 255 on the discharge side of the low tide reservoir 222, which develops electricity from the water flowing during the emptying of the low tide reservoir 222. The water wheel generator arrangements can be enclosed by a housing 264. The gates 241 can be regulated to allow drainage from the reservoir during the low tide period to extend throughout the time that the low tide level 262 remains below the level of the drain lines. In this manner, electricity can be generated for the longest possible time during the discharge cycle.

Figure 5:
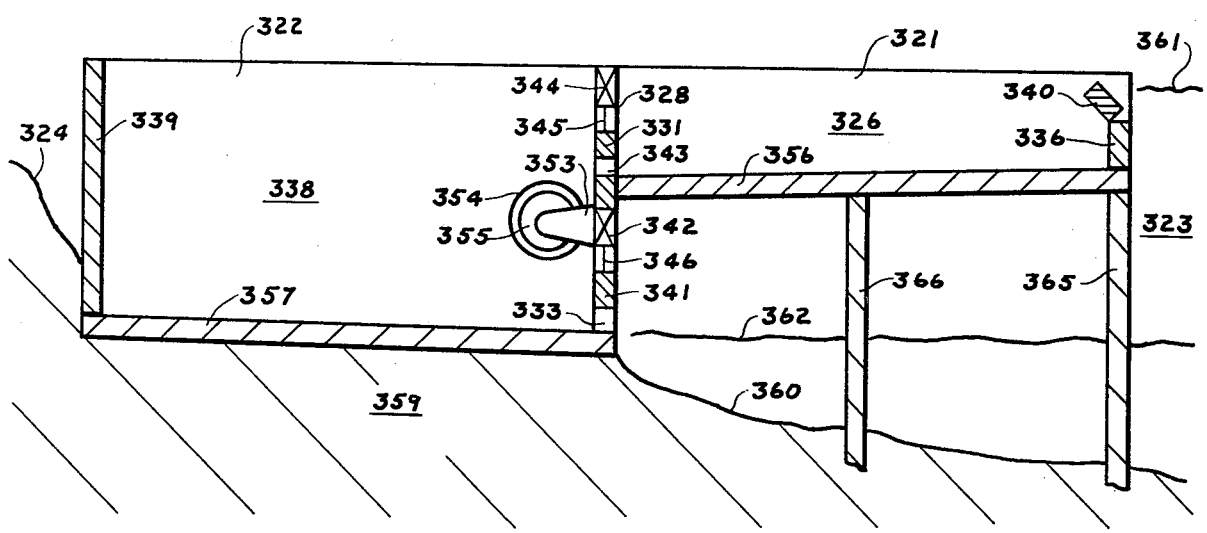
FIG. 5 is a cross-sectional view similar to FIG. 2 of yet another embodiment of the invention.

In the embodiment of the invention shown in FIG. 5, the entire system is positioned on the seaward side of the shoreline 324 and functions essentially in the same manner as that in FIGS. 1, 2, 3 and 4. In FIG. 5, however, the end member 339 and the side member 338 are increased in height so as to completely enclose the low tide reservoir 322 and the water wheel 355 connected to generator 354 during the period of the highest anticipated water level of the sea. The high tide reservoir is supported by a plurality of support members 365 and 366 which are fixed on one end into the sea floor 360.

In general, the larger the reservoirs are, the greater amount of water can be stored between successive high and low tide periods which produces a greater flow of water and therefore more electricity can be generated. Depending on the shoreline and tide conditions and the preference of the builder, the typical reservoir size may range from approximately 100 to 200 feet in length and width to one or more miles in either direction.

The typical depth of the reservoirs will usually be governed by the range between the high tide and low tide levels of the sea and could range from several inches to several feet. The length, width and depth of the reservoir may also be partially governed by whether the tidal action is diurnal or semidiurnal. In areas where tidal action is semidiurnal (two high and two low tide periods per day), such as along the east coast of the United States, a reservoir of a given size can produce approximately twice the amount of electricity as the same size reservoir with diurnal tidal action (one high and one low tide per day). This is because the high tide reservoir fills twice per day rather than once and, therefore, can be drained approximately twice as fast producing a greater water flow to the water wheel.

A typical semidiurnal reservoir system where the high tide reservoir ranges from 100 to 200 feet in length and width and 4 to 5 feet in depth could supply the total energy needs for several typical homes whereas a reservoir ranging from one or more miles in length and width and several feet in depth depending on tidal range, could supply the complete energy needs for several thousand homes.

The foregoing specification sets forth the invention in its preferred, practical forms but the structure shown is capable of modification within the range of equivalents without departing from the invention which is to be understood is broadly novel as is commensurate with the appended claims.

The embodiments of the invention in which an exclusive property or privilege is claimed are defined as follows:

1. A tidewater power system comprising a high tide water reservoir (21) and a low tide water reservoir (30) disposed below said high tide water reservoir,
   said reservoirs being adapted to be disposed adjacent a body of water subject to tidal action wherein the level of said water changes periodically from high tide level to low tide level,
   said high tide reservoir having an inlet gate adjacent said body of water and an outlet,
   said low tide reservoir having a bottom disposed substantially at said low tide water level,
   said outlet from said high tide reservoir being on the side of said high tide reservoir remote from said body of water,
   said low tide reservoir being disposed to receive water discharged from said outlet gate from said high tide reservoir,
   drain lines from said low tide reservoir for returning water from said low tide reservoir to said body of water at low tide,
   and a water wheel supported on the side of said high tide reservoir and said low tide reservoir remote from said body of water between said high tide reservoir and said low tide reservoir in the path of water from said high tide reservoir to said low tide reservoir whereby water from said outlet gate acts on said wheel driving it to generate electricity.

2. The system recited in claim 1 wherein said outlet gate from said high tide reservoir is adjustable.

3. The system recited in claim 1 wherein said drain lines from said low tide reservoir can be closed by an adjustable gate.

4. The system recited in claim 1 wherein a second water wheel and generator are provided, the second water wheel and generator is disposed in the path of the drainage of water from said low tide reservoir to said body of water.

5. The system recited in claim 4 wherein said second water wheel generator is disposed in an enclosure beneath the said high tide reservoir.

6. The system recited in claim 1 wherein said high tide reservoir is supported within the water supply source.

7. The system recited in claim 1 wherein said inlet to said high tide reservoir has an adjustable gate for closing the opening from said body of water.

8. A tidewater reservoir power system comprising,
   a reservoir constructed in or adjacent to a body of water subject to tidal action,
   said reservoir being positioned at substantially high tide level of said body of water,
   one or more water wheel, generator arrangements mounted to said reservoir,
   a means of directing and controlling water flow from said reservoir to said water wheel,
   a second reservoir positioned at substantially low tide level of said body of water, a means of directing water flow from said water wheel to said second reservoir, and a means of directing and controlling water flow from said second reservoir to said body of water subject to tidal action.

9. The tidewater reservoir power system recited in claim 8 comprising, one or more water wheel generator arrangements on or near said second reservoir, a means of directing and controlling said water flow from said second reservoir to said water wheel, and a means of further directing and controlling said water flow to said open body of water subject to tidal action.

* * * * *